(12) United States Patent
Yotsuyanagi et al.

(10) Patent No.: US 11,618,399 B2
(45) Date of Patent: Apr. 4, 2023

(54) SHOCK ABSORBING MEMBER

(71) Applicant: MAZDA MOTOR CORPORATION, Hiroshima (JP)

(72) Inventors: Taiki Yotsuyanagi, Aki-gun (JP); Tsuyoshi Nishihara, Aki-gun (JP); Ryo Shimoda, Aki-gun (JP); Chikara Kawamura, Aki-gun (JP); Tsuneki Shimanaka, Aki-gun (JP); Kota Yoshida, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 194 days.

(21) Appl. No.: 17/131,965

(22) Filed: Dec. 23, 2020

(65) Prior Publication Data
US 2021/0213899 A1 Jul. 15, 2021

(30) Foreign Application Priority Data
Jan. 15, 2020 (JP) .............................. JP2020-004244

(51) Int. Cl.
*B60R 19/34* (2006.01)
*F16F 7/00* (2006.01)
*F16F 7/12* (2006.01)

(52) U.S. Cl.
CPC .............. *B60R 19/34* (2013.01); *F16F 7/003* (2013.01); *F16F 7/12* (2013.01); *F16F 2224/0233* (2013.01); *F16F 2224/0241* (2013.01)

(58) Field of Classification Search
CPC ...... F16F 7/003; F16F 7/12; F16F 2224/0233; F16F 2224/0241; B60R 19/34
See application file for complete search history.

(56) References Cited

U.S. PATENT DOCUMENTS

| 5,785,367 A | * | 7/1998 | Baumann | ................ B62D 21/15 |
| | | | | 293/133 |
| 6,601,886 B1 | * | 8/2003 | Thayer | ..................... F16F 7/127 |
| | | | | 293/133 |
| 8,684,427 B2 | * | 4/2014 | Marur | ..................... B60R 19/18 |
| | | | | 293/120 |
| 9,598,035 B2 | * | 3/2017 | Mukainakano | ......... B60R 19/34 |
| 9,919,668 B2 | * | 3/2018 | Kitakata | .............. B62D 21/152 |

(Continued)

FOREIGN PATENT DOCUMENTS

| JP | H08177922 A | 7/1996 |
| JP | 2017002998 A | 1/2017 |

*Primary Examiner* — Thomas W Irvin
(74) *Attorney, Agent, or Firm* — Studebaker & Brackett PC

(57) ABSTRACT

A shock absorbing member is provided having a sequential destruction capability and protection against electrolytic corrosion on fastening-fixing portions thereof to be fastened to a bumper reinforcement or a vehicle body. Embodiments include a shock absorbing member between a bumper reinforcement and a vehicle body, including a distal end portion fastened to the bumper reinforcement; a base end flange portion fastened to the vehicle body; and an absorbing member body extending in a vehicle front-rear direction and connecting the distal end portion and the base end flange portion. The absorbing member body includes a carbon fiber-glass reinforced plastic layer. Fastening-fixing portions of the distal end portion and the base end flange portion are composed of glass fiber reinforced plastic layers.

13 Claims, 7 Drawing Sheets

(56) References Cited

U.S. PATENT DOCUMENTS

| | | | |
|---|---|---|---|
| 10,479,302 B2* | 11/2019 | Kawamura | B62D 25/08 |
| 10,604,094 B2* | 3/2020 | Kawamura | B60R 19/03 |
| 10,994,680 B2* | 5/2021 | Kawamura | B60R 19/18 |
| 2012/0104775 A1* | 5/2012 | Marur | B60R 19/34 264/261 |
| 2015/0069774 A1* | 3/2015 | Mukainakano | B60R 19/26 293/132 |
| 2016/0325701 A1* | 11/2016 | Yabu | B60R 19/18 |
| 2017/0080884 A1* | 3/2017 | Kitakata | B60R 19/03 |
| 2018/0141512 A1* | 5/2018 | Munjurulimana | B60R 19/18 |
| 2019/0270420 A1* | 9/2019 | Kawamura | F16F 7/12 |
| 2020/0130335 A1* | 4/2020 | Uchida | B32B 5/024 |
| 2020/0384934 A1* | 12/2020 | Yotsuyanagi | B60R 19/18 |
| 2021/0253171 A1* | 8/2021 | Yotsuyanagi | B62D 21/157 |
| 2021/0253172 A1* | 8/2021 | Shimoda | B62D 21/152 |

* cited by examiner

SHOCK ABSORBING MEMBER

TECHNICAL FIELD

The present disclosure relates to a shock absorbing member provided between a bumper reinforcement and a vehicle body.

BACKGROUND ART

A crash box as a shock absorbing member has been known that is interposed between a bumper reinforcement and a vehicle body in front and rear portions of a vehicle to absorb collision energy. In the case where the crash box is configured to have a sequential destruction capability (see, e.g., Japanese Patent Laid-Open No. 2017-002998), carbon fiber-glass reinforced plastics (CFRP) or glass fiber reinforced plastics (GI-RP) are used.

Of these fiber reinforced plastics, the use of carbon fiber-glass reinforced plastics is preferable because of its superior strength. However, due to having conductivity, carbon fiber-glass reinforced plastics has a large potential difference from a vehicle-body metal (aluminum or aluminum alloy), such as a set plate at a distal end of a front side frame or a rear side frame to which the crash box is fastened, posing a problem of electrolytic corrosion (corrosion caused by electric current; more specifically referred to as stray current corrosion) resulting from electricity flowing in a fastening portion and through water and the like.

Previous measures against this problem involve interposing a member that does not conduct electricity, such as an insulating member, between the fastening portion of the crash box and the vehicle body, but such measures require an additional member, having a drawback of increased cost.

While Japanese Patent Laid-Open No. 8-177922 discloses a crash box using the aforementioned carbon fiber-glass reinforced plastics or glass fiber reinforced plastics, it does not at all disclose the technical problem of electrolytic corrosion caused by the use of carbon fiber-glass reinforced plastics.

SUMMARY

Hence, the present disclosure provides a shock absorbing member that has a sequential destruction capability and is protected against corrosion (electrolytic corrosion) on fastening-fixing portions thereof to be fastened to a bumper reinforcement or a vehicle body.

A shock absorbing member according to the present disclosure is a shock absorbing member provided between a bumper reinforcement and a vehicle body, and the shock absorbing member includes: a distal end portion fastened to the bumper reinforcement; a base end flange portion fastened to the vehicle body; and an absorbing member body extending in a vehicle front-rear direction and connecting the distal end portion and the base end flange portion, wherein the absorbing member body includes a carbon fiber-glass reinforced plastic layer, and fastening-fixing portions of the distal end portion and the base end flange portion include a glass fiber reinforced plastic layer.

This configuration provides the shock absorbing member with a sequential destruction capability, and also prevents corrosion (electrolytic corrosion) of fastening-fixing portions to be fastened the bumper reinforcement or the vehicle body as these fastening-fixing portions of the distal end portion and the base end flange portion are formed of a glass fiber reinforced plastic layer. Also, this configuration allows for increasing the strength of the absorbing member body and reducing the thickness thereof as the absorbing member body is formed so as to include a carbon fiber-glass reinforced plastic layer.

In one aspect of the present disclosure, portions of the distal end portion and the base end flange portion around an insertion hole into which a fastening member is inserted have a glass fiber reinforced plastic layer over an entire plate thickness. The fastening member may be a fastening bolt. This configuration ensures a reliable electrolytic corrosion prevention effect as the portion around the insertion holes is formed of a glass fiber reinforced plastic layer over the entire plate thickness.

In one aspect of the present disclosure, a transitioning portion between the carbon fiber-glass reinforced plastic layer and the glass fiber reinforced plastic layer is composed of both of the layers alternately stacked on top of each other. This configuration helps increase inter-layer bonding strength of the transitioning portion and eventually ensures increased strength of the shock absorbing member as the transitioning portion is composed of both of the above layers alternately stacked on top of each other.

In one aspect of the present disclosure, stacked layers are disposed at and around a portion of the absorbing member body joined to the base end flange portion such that the number of the stacked layers gradually increases from a distal end side to a base end side. By virtue of the incremental formation of the stacked layers, this configuration helps increase the strength of the portion of the absorbing member body near its joined portion.

In one aspect of the present disclosure, the absorbing member body comprises two layers including an outermost layer, and the outermost layer includes a glass fiber reinforced plastic layer. As the outermost layer is composed of a glass fiber reinforced plastic layer, this configuration helps increase corrosion resistance and durability against wetting, scattering of foreign matters, chipping (small cracks caused by stones flicked up during traveling of the vehicle), and the like.

The embodiments of the present disclosure provide a shock absorbing member with a sequential destruction capability, and prevent corrosion (electrolytic corrosion) on fastening-fixing portions thereof to be fastened to a bumper reinforcement or a vehicle body.

DETAILED DESCRIPTION

The provision of a shock absorbing member with a sequential destruction capability and prevention of corrosion (electrolytic corrosion) on fastening-fixing portions thereof to be fastened to a bumper reinforcement or a vehicle body is achieved by a shock absorbing member provided between the bumper reinforcement and the vehicle body including: a distal end portion fastened to the bumper reinforcement; a base end flange portion fastened to the vehicle body; and an absorbing member body extending in a vehicle front-rear direction and connecting the distal end portion and the base end flange portion, wherein the absorbing member body includes a carbon fiber-glass reinforced plastic layer, and fastening-fixing portions of the distal end portion and the base end flange portion include a glass fiber reinforced plastic layer.

Figure 1:
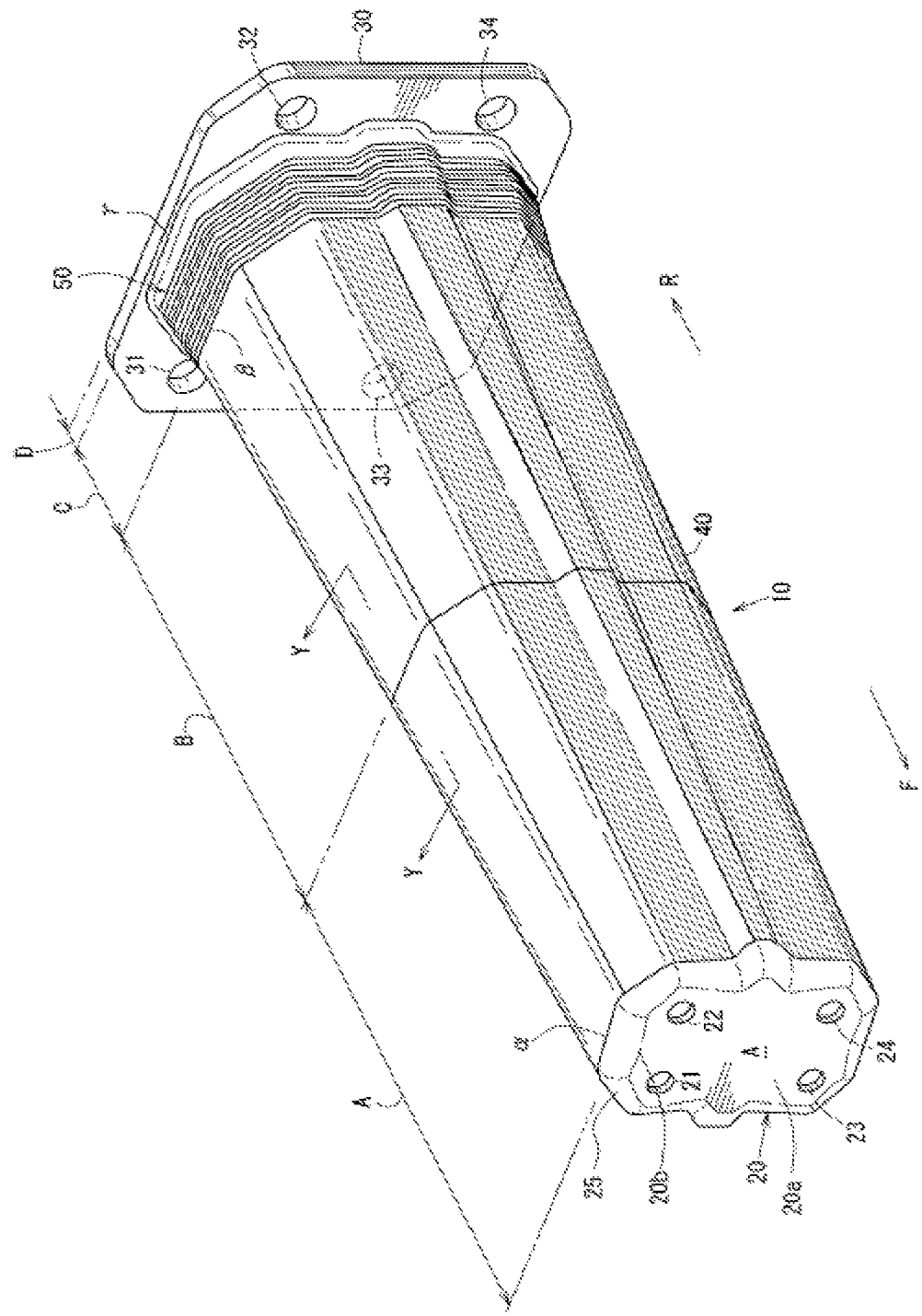
FIG. 1 is an external perspective view of a shock absorbing member of the present disclosure.
Figure 2:
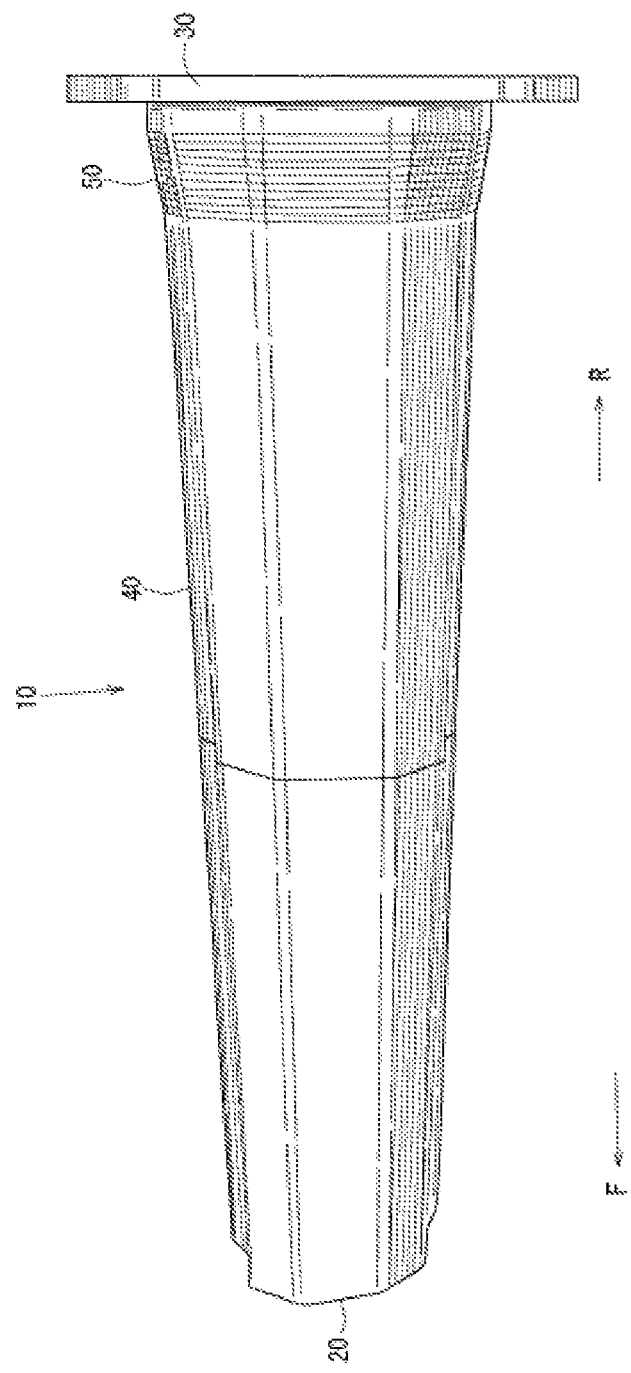
FIG. 2 is a plan view of the shock absorbing member of FIG. 1.
Figure 3:
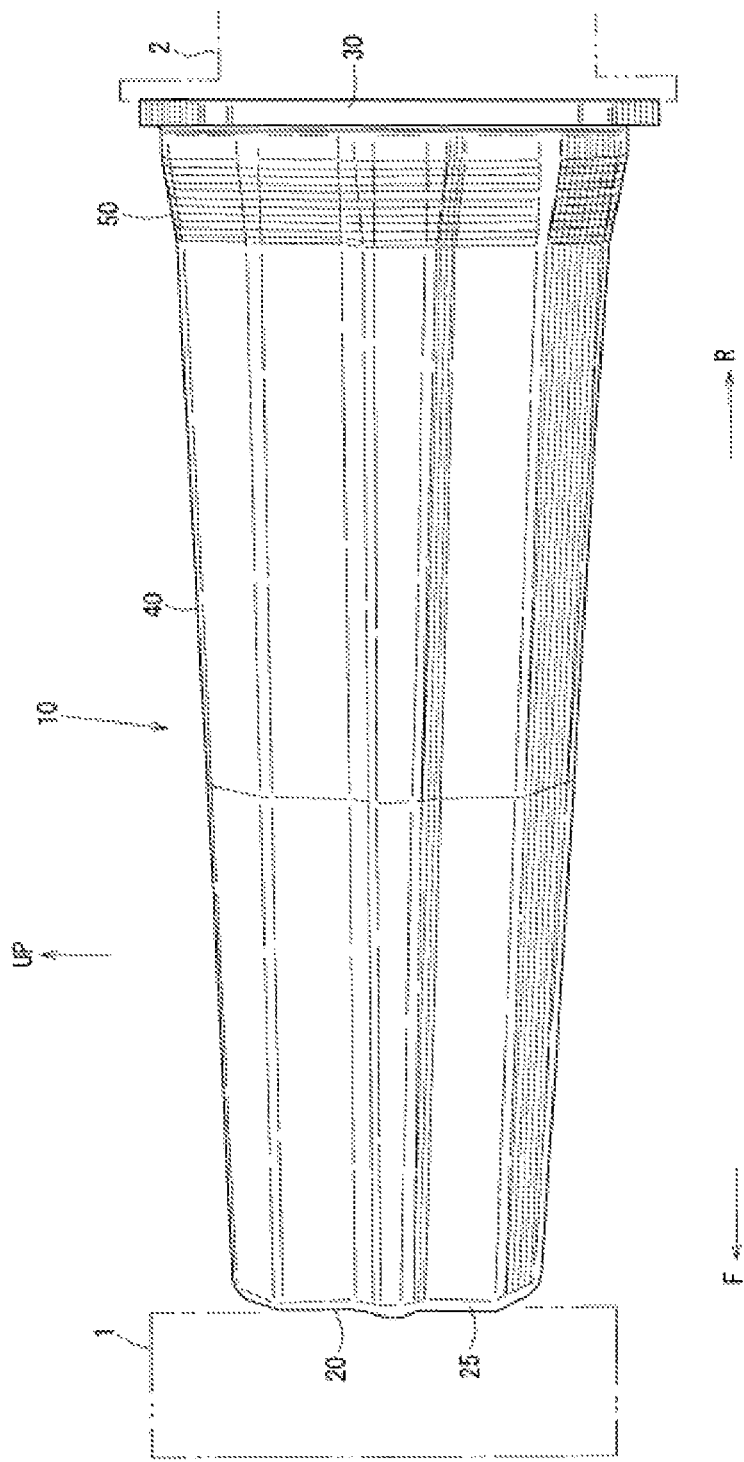
FIG. 3 is a side view of the shock absorbing member of FIG. 1.
Figure 4:
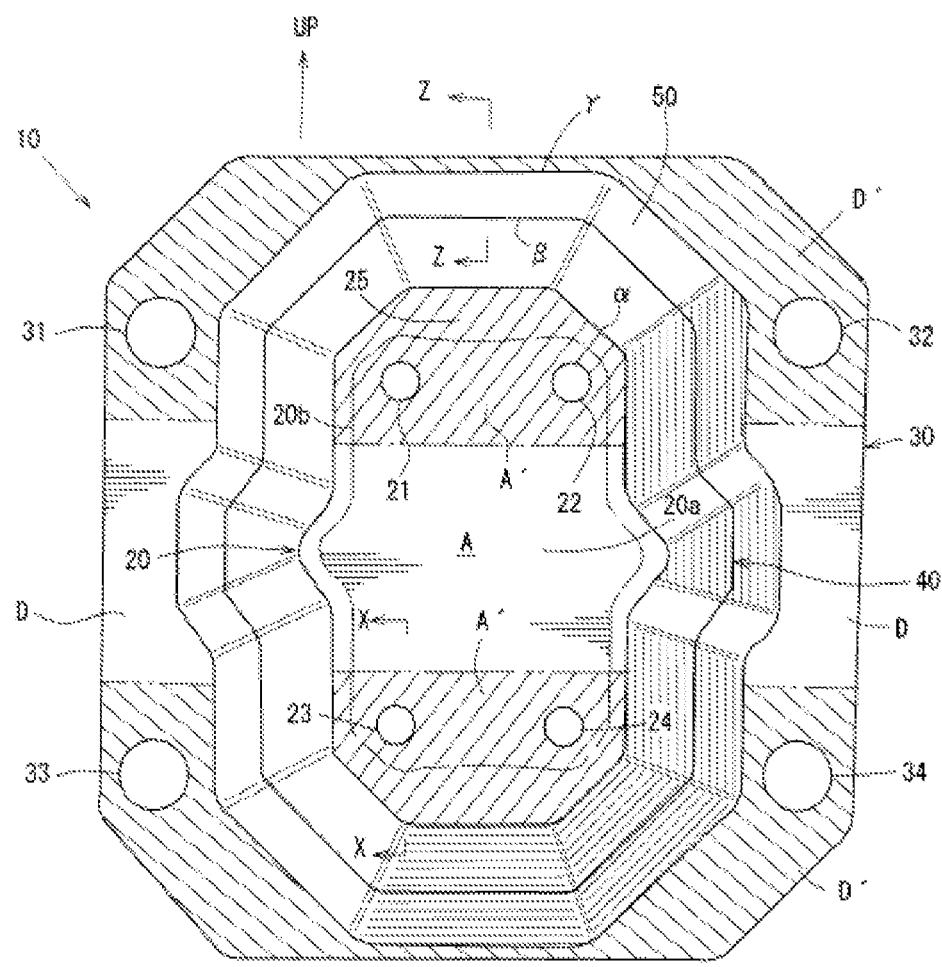
FIG. 4 is a front view of the shock absorbing member of FIG. 1.
Figure 5:
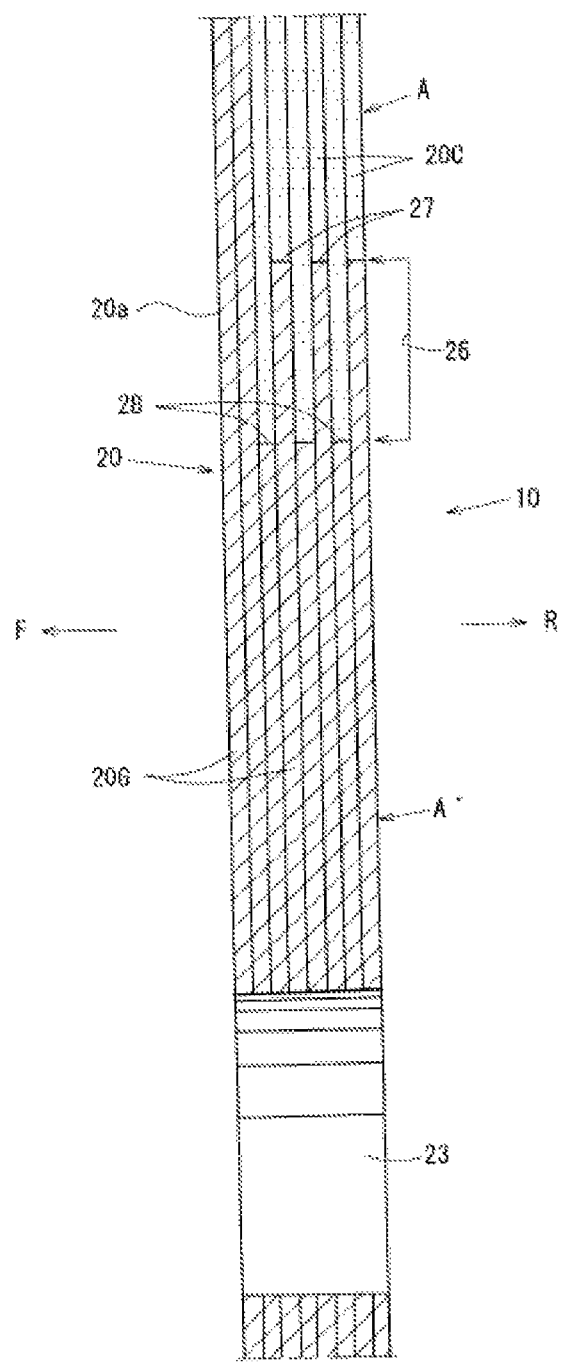
FIG. 5 is an enlarged sectional view of major parts taken along a line X-X in FIG. 4.
Figure 6:
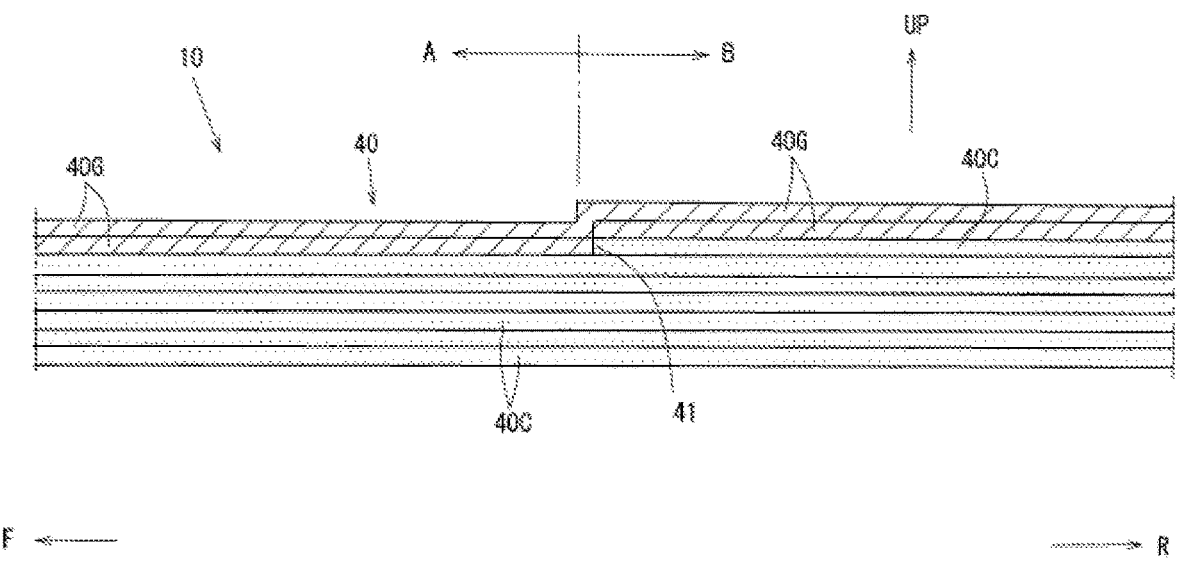
FIG. 6 is an enlarged sectional view of major parts taken along a line Y-Y in FIG. 1.
Figure 7:
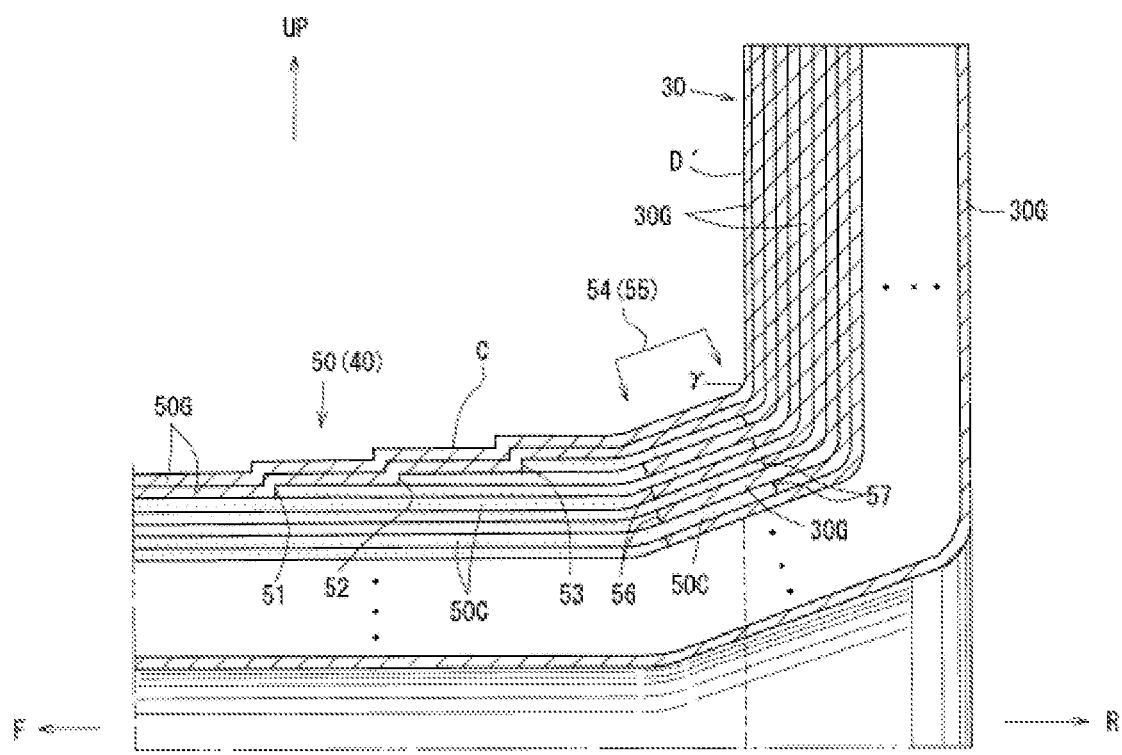
FIG. 7 is an enlarged sectional view of major parts taken along a line Z-Z in FIG. 4.

An embodiment of the present disclosure will be described in detail below with reference to the drawings. The drawings illustrate a shock absorbing member; FIG. 1 is an external perspective view of the shock absorbing member, FIG. 2 is a plan view of the shock absorbing member, FIG. 3 is a side view of the shock absorbing member, FIG. 4 is a front view of the shock absorbing member, FIG. 5 is an enlarged sectional view of major parts taken along a line X-X in FIG. 4, FIG. 6 is an enlarged sectional view of major parts taken along a line Y-Y in FIG. 1, and FIG. 7 is an enlarged sectional view of major parts taken along a line Z-Z in FIG. 4. In the drawings, an arrow F represents a vehicle frontward direction, an arrow R represents a vehicle rearward direction, and an arrow UP represents a vehicle upward direction.

A crash box 10 as the shock absorbing member of the present embodiment may be used for both of a crash box on a front side of a vehicle and a crash box on a rear side of the vehicle. The embodiment below describes the case where the crash box 10 is used for a crash box on the front side of the vehicle, and accordingly the vehicle front side denoted by the arrow F corresponds to a distal end side and the vehicle rear side denoted by the arrow R corresponds to a base end side.

The crash box 10 (shock absorbing member) shown in FIGS. 1 to 3 is provided between a bumper reinforcement 1 and a vehicle body 2, such as a front side frame as a vehicle body strengthening member, to absorb a collision load in the event of a vehicle collision. Preferably, the crash box 10 has a sequential destruction capability disclosed in Japanese Patent Laid-Open No. 2017-002998.

As shown in FIGS. 1 to 3, the crash box 10 includes a distal end portion 20 fastened to the bumper reinforcement 1, a base end flange portion 30 fastened to the vehicle body 2, and a crash box body 40 (absorbing member body) extending in a vehicle front-rear direction and integrally connecting the distal end portion 20 and the base end flange portion 30.

The distal end portion 20 of the crash box 10 is formed flat to allow it to be easily mounted to the bumper reinforcement, and the distal end portion 20 is formed at its four corners with bolt insertion holes 21, 22, 23, and 24 each as a mounting portion. Each of these bolt insertion holes 21 to 24 is an insertion hole into which a bolt as a fastening member is inserted.

The base end flange portion 30 of the crash box 10 is formed flat to allow it to be easily mounted to the vehicle body, and the base end flange portion 30 is formed, at its four upper left, upper right, lower left, and lower right locations, with bolt insertion holes 31, 32, 33, and 34 each as a mounting portion. Each of these bolt insertion holes 31 to 34 is an insertion hole into which a bolt as a fastening member is inserted.

The crash box body 40 of the crash box 10 is formed such that its dimensions in an up-down direction and a vehicle width direction gradually increase from the distal end side (vehicle front side) to the base end side (vehicle rear side), and is also formed in a polygonal cylindrical shape in vehicle front view. In the present embodiment, the crash box body 40 is formed in a hexadecagonal cylindrical shape, as shown in FIGS. 1 and 4.

The distal end portion 20 includes a flat portion 20a formed flat and positioned at the most distal end and an annular rounded portion 25 connecting an outer peripheral edge 20b of the flat portion 20a and the distal end of the crash box body 40. As shown in FIGS. 1 and 4, a boundary between the rounded portion 25 and the distal end of the crash box body 40 is defined as a position $\alpha$, a distal end of a multi-step portion 50 (described later) located near the base end of the crash box body 40 is defined as a position $\beta$, and a boundary between the base end of the crash box body 40 and the base end flange portion 30 is defined as a position $\gamma$. In FIG. 4, however, the multi-step structure of the multi-step portion 50 has been omitted for the sake of simplicity.

As shown in FIGS. 1 and 4, an intermediate portion of the distal end portion 20 in the up-down direction and a region from the position $\alpha$ to an intermediate portion of the crash box body 40 in the front-rear direction are each defined as an area A. A region from the intermediate portion of the crash box body 40 in the front-rear direction to the position $\beta$ is defined as an area B. Also, a region from the position $\beta$ to a distal end face of the base end flange portion 30 is defined as an area C. Additionally, the base end flange portion 30 is defined as an area D.

Fastening-fixing portions of the distal end portion 20 of the crash box 10 shown in FIG. 4, namely upper and lower portions of the distal end portion 20 including the insertion holes 21, 22, 23, and 24 into which the respective bolt as the fastening member is inserted (see hatched areas A', A' in FIG. 4) are formed of layers of glass fiber reinforced plastics (hereinafter abbreviated simply as GFRP), namely GFRP layers 20G over the entire plate thickness, as shown in FIG. 5. That is, the areas A', A' shown in FIG. 4 are formed of the GFRP layers 20G over the entire plate thickness, as shown in FIG. 5. The GFRP is a composite made of glass fiber as a reinforcing material and plastics as a matrix. Using the GFRP layers 20G for the entire plate thickness of the area A' ensures a reliable electrolytic corrosion prevention effect by virtue of high electrical insulation of the GFRP layers 20G.

The sectional view shown in FIG. 5 depicts a structure in which eight GFRP layers 20G are stacked in the area A', though the number of layers is not limited to eight. As shown in FIG. 4, the area A is defined between the upper and lower areas A', A', which are insertion hole portions of the distal end portion 20 allowing for insertion of the respective fastening members.

As shown in FIG. 5, only two outermost layers of the area A are formed of the GFRP layers 20G, and the other layers thereof are formed of layers of carbon fiber-glass reinforced plastics (hereinafter abbreviated simply as CFRP), namely CFRP layers 20C. That is, the distal end portion 20 is entirely formed of the CFRP layers 20C except the outermost layers, and this helps increase strength and reduce thickness. The CFRP layer 20C is made of plastic-bonded CF (carbon fiber), and in the present embodiment, thermosetting resin is used as a base material.

As shown in FIG. 5, a transitioning portion 26 between the CFRP layers 20C and the GFRP layers 20G is composed of both of these layers 20C, 20G alternately stacked on top of each other. The CFRP layer 20C and the GFRP layer 20G are formed by sequentially stacking semi-cured prepregs obtained by impregnation of CF (carbon fiber) and GF (glass fiber) with liquid epoxy resin (thermosetting resin) and then heating and curing the prepregs by a heating apparatus such as a microwave. At this time, the CFRP layers 20C and the GFRP layers 20G are alternately stacked on top of each other in the transitioning portion 26 between these layers 20C, 20G, which helps increase inter-layer bonding strength of the transitioning portion 26 and eventually ensure increased strength of the crash box 10.

As shown in FIG. 5, seams 27 at the upper end of the transitioning portion 26 and seams 28 at the lower end of the transitioning portion 26 each have an abutting structure and are formed such that these seams 27, 27 are positioned at the same height in the up-down direction and seams 28, 28 are positioned at the same height in the up-down direction.

As shown in FIG. 6, the crash box body 40 is entirely formed of CFRP layers 40C except its outermost layer. This helps both increase the strength of the crash box body 40 and reduce the thickness thereof. Also, as shown in FIG. 6, the outermost layer of the crash box body 40 is formed of two layers, which are GFRP layers 40G. Using the GFRP layer 40G for the outermost layer of the crash box body 40 helps increase corrosion resistance and durability against wetting, scattering of foreign matters, chipping (small cracks caused by stones flicked up during traveling of the vehicle), and the like.

As shown in FIG. 6, the crash box body 40 is formed of a total of n layers (eight layers in the present embodiment) of the GFRP layers 40G and the CFRP layers 40C in the area A, and is formed of a total of n+1 layers (nine layers in the present embodiment) of the GFRP layers 40G and the CFRP layers 40C in the area B. Hence, a seam 41 is formed between the second outermost layer 40G in the area A and the third outermost layer 40C in the area B, and the seam 41 has an abutting structure where both layers abut on each other. It should be noted that the number of layers is not limited to eight and nine.

Fastening-fixing portions of the base end flange portion 30 of the crash box 10 shown in FIG. 4, namely upper and lower portions of the base end flange portion 30 including the insertion holes 31, 32, 33, and 34 into which the respective bolt as the fastening member is inserted (see hatched areas D', D' in FIG. 4) are formed of GFRP layers 30G over the entire plate thickness, as shown in FIG. 7. That is, the areas D', D' shown in FIG. 4 are formed of the GFRP layers 30G over the entire plate thickness, as shown in FIG. 7. Using the GFRP layers 30G for the entire plate thickness of the area D' ensures a reliable electrolytic corrosion prevention effect by virtue of high electrical insulation of the GFRP layers 30G.

As shown in FIG. 4, an area D is defined between the upper area D' and the lower area D'. Only two outermost layers of the area A are formed of the GFRP layers 30G, and the other layers thereof are formed of the CFRP layers. As described above, using the CFRP layers for these other layers of the area D helps increase the strength of the base end flange portion 30 and reduce the thickness thereof.

As shown in FIG. 7, stacked layers are formed at and around a portion of the crash box body 40 joined to the base end flange portion 30 (see the area C) as a multi-step portion 50 in which the number of the stacked layers gradually increases from the distal end side to the base end side. That is, as shown in FIG. 7, outermost two layers of the multi-step portion 50 are GFRP layers 50G while the other layers thereof except the outermost two layers are CFRP layers 50C, and the multi-step portion 50 is given a multi-step shape such that the number of stacked layers is sequentially incremented by one from the distal end side to the base end side.

In the present embodiment, a total of eleven steps are formed for the structure in the area C as shown in FIG. 1, though the number of steps is not limited to eleven. The incremental formation of the stacked layers in the multi-step portion 50 helps increase the strength of the portion of the crash box body 40 near the portion thereof joined to the base end flange portion 30 (refer to the area C).

As the area C is given the multi-step shape, seams 51, 52, 53 between the GFRP layers 50G and the CFRP layers 50C are formed at boundaries of the respective steps, and each of these seams 51, 52, and 53 has an abutting structure where both layers abut on each other.

As shown in FIG. 7, between the base end side of the multi-step portion 50 and the position γ, an enlarging portion 54 is formed where the diameter of the crash box body 40 increases in the up-down direction and outward in a vehicle width direction. At the enlarging portion 54, there is formed a transitioning portion 55 between the CFRP layers 50C of the multi-step portion 50 and the GFRP layers 30G extending from the base end flange portion 30 to the enlarging portion 54.

As shown in FIG. 7, the transitioning portion 55 between the CFRP layers 50C and the GFRP layers 30G is composed of both of these layers 50C, 30G alternately stacked on top of each other, and this helps increase inter-layer bonding strength of the transitioning portion 55 and eventually ensure increased strength of the crash box 10. Also, as shown in FIG. 7, seams 56 on the distal end side of the transitioning portion 55 and seams 57 on the base end side of the transitioning portion 55 each have an abutting structure, and these seams 56 and seams 57 are formed so as to be arranged in a respective straight line in an inside-outside direction.

While FIG. 7, which is a sectional view along the line Z-Z in FIG. 4, illustrates the transitioning portion 55 between the base end flange portion 30 and the multi-step portion 50, a transitioning portion between the area D' and the area D shown in FIG. 4 is also composed of the GFRP layers 30G and CFRP layers alternately stacked on top of each other. For the sake of simplicity, intermediate layers of the layers 30G, 50C in the inside-outside direction have been omitted in FIG. 7.

As described above, the crash box of the above embodiment is the crash box 10 provided between the bumper reinforcement 1 and the vehicle body 2. The crash box 10 includes: the distal end portion 20 fastened to the bumper reinforcement 1; the base end flange portion 30 fastened to the vehicle body 2; and the crash box body 40 extending in the vehicle front-rear direction and connecting the distal end portion 20 and the base end flange portion 30. The crash box body 40 is formed so as to include the carbon fiber-glass reinforced plastic layers (CFRP layers 40C), and fastening-fixing portions of the distal end portion 20 and the base end flange portion 30 (see the areas A', D') are formed of the glass fiber reinforced plastic layers (see the GFRP layers 20G, 30G) (see FIGS. 1 and 3 to 7).

This configuration provides the crash box 10 with a sequential destruction capability, and also prevents corrosion (electrolytic corrosion) on the fastening-fixing portions to be fastened to the bumper reinforcement or the vehicle body (see the areas A', D') as these fastening-fixing portions of the distal end portion 20 and the base end flange portion 30 (see the areas A', D') are formed of the glass fiber reinforced plastic layers (GFRP layers 20G, 30G). Also, this configuration allows for increasing the strength of the crash box body 40 and reducing the thickness thereof as the crash box body 40 is formed so as to include the carbon fiber-glass reinforced plastic layers (CFRP layers 40C).

In one embodiment of the present disclosure, portions of the distal end portion 20 and the base end flange portion 30 around the insertion holes 21 to 24 and 31 to 34 into which the respective fastening member (see the bolt) is inserted (the areas A', D') are formed of the glass fiber reinforced plastic layers (GFRP layers 20G, 30G) over the entire plate thickness (see FIGS. 5 and 7). This configuration ensures a reliable electrolytic corrosion prevention effect as the portions around the insertion holes 21 to 24 and 31 to 34 are formed of the glass fiber reinforced plastic layers (GFRP layers 20G, 30G) over the entire plate thickness.

Additionally, in one embodiment of the present disclosure, the transitioning portions 26, 55 between the carbon fiber-glass reinforced plastic layers 20C, 50C and the glass fiber reinforced plastic layers 20G, 30G are composed of both of these layers alternately stacked on top of each other (see FIGS. 5 and 7). This configuration helps increase inter-layer bonding strength of the transitioning portions 26, 55 and eventually ensure increased strength of the crash box 10 as the transitioning portions 26, 55 are composed of both of the above layers alternately stacked on top of each other.

In one embodiment of the present disclosure, stacked layers are formed at and around the portion (see the area C) of the crash box body 40 joined to the base end flange portion 30 such that the number of the stacked layers (see the multi-step portion 50) gradually increases from the distal end side to the base end side (see FIG. 7). By virtue of the incremental formation of the stacked layers, this configuration helps increase the strength of the portion (area C) of the crash box body 40 near its joined portion.

Additionally, in one embodiment of the present disclosure, the crash box body 40 is formed of two layers including the outermost layer, and the outermost layer is formed of the glass fiber reinforced plastic layer (GFRP layer 40G) (see FIG. 6). As the outermost layer is composed of the glass fiber reinforced plastic layer (GFRP layer 40G), this configuration helps increase corrosion resistance and durability against wetting, scattering of foreign matters, chipping (small cracks caused by stones flicked up during traveling of the vehicle), and the like.

As regards correspondence between the configuration of the present disclosure and the above embodiments, the shock absorbing member of the present disclosure corresponds to the crash box 10 of the embodiments, and likewise, the absorbing member body corresponds to the crash box body 40, the carbon fiber-glass reinforced plastic layer corresponds to the CFRP layers 20C, 40C, and 50C, the glass fiber reinforced plastic layer corresponds to the GFRP layers 20G, 30G, and 40G, the fastening-fixing portions of the distal end portion and the base end flange portion correspond to the areas A', D', the fastening member corresponds to the bolt, the insertion hole corresponds to the bolt insertion holes 21 to 24 and 31 to 34, and the portion of the crash box body 40 near the portion thereof joined to the base end flange portion 30 corresponds to the area C, though the present disclosure is not limited to the configuration of the above embodiments.

For example, while in the above embodiments the description has been given of the crash box 10 on the front side of the vehicle, the present disclosure may be applied to a crash box on the rear side of the vehicle; in this case, the vehicle front side denoted by the arrow F corresponds to the base end side while the vehicle rear side denoted by the arrow R corresponds to the distal end side.

As described above, the embodiments of the present disclosure are useful for shock absorbing members provided between a bumper reinforcement and a vehicle body.

What is claimed is:

1. A shock absorbing member provided between a bumper reinforcement and a vehicle body, the shock absorbing member comprising:
   a distal end portion fastened to the bumper reinforcement;
   a base end flange portion fastened to the vehicle body; and
   an absorbing member body extending in a vehicle front-rear direction and connecting the distal end portion and the base end flange portion, wherein
   the absorbing member body includes a carbon fiber-glass reinforced plastic layer,
   fastening-fixing portions of the distal end portion and the base end flange portion comprise a glass fiber reinforced plastic layer,
   the distal end portion and the base end flange portion are each plate-shaped and have a plate thickness,
   a first portion of each of the distal end portion and the base end flange portion around an insertion hole into which a fastening member is inserted has a glass fiber reinforced plastic layer over the entire plate thickness, and
   a second portion of each of the distal end portion and the base end flange portion not including the insertion hole is attached to the first portion and comprises a carbon fiber-glass reinforced plastic layer and a glass fiber reinforced plastic layer.

2. The shock absorbing member according to claim 1, wherein
   stacked layers are disposed at and around a portion of the absorbing member body joined to the base end flange portion such that the number of the stacked layers gradually increases from a distal end side to a base end side.

3. The shock absorbing member according to claim 2, wherein
   the absorbing member body includes two layers including an outermost layer, and
   the outermost layer comprises a glass fiber reinforced plastic layer.

4. The shock absorbing member according to claim 2, wherein
   the absorbing member body includes two layers including an outermost layer, and
   the outermost layer comprises a glass fiber reinforced plastic layer.

5. The shock absorbing member according to claim 1, wherein
   a transitioning portion between the carbon fiber-glass reinforced plastic layer and the glass fiber reinforced plastic layer is composed of both of the layers alternately stacked on top of each other.

6. The shock absorbing member according to claim 5, wherein
   stacked layers are disposed at and around a portion of the absorbing member body joined to the base end flange portion such that the number of the stacked layers gradually increases from a distal end side to a base end side.

7. The shock absorbing member according to claim 6, wherein
   the absorbing member body includes two layers including an outermost layer, and the outermost layer comprises a glass fiber reinforced plastic layer.

8. The shock absorbing member according to claim 5, wherein
the absorbing member body includes two layers including an outermost layer, and
the outermost layer comprises a glass fiber reinforced plastic layer.

9. The shock absorbing member according to claim 1, wherein
stacked layers are disposed at and around a portion of the absorbing member body joined to the base end flange portion such that the number of the stacked layers gradually increases from a distal end side to a base end side.

10. The shock absorbing member according to claim 9, wherein
the absorbing member body includes two layers including an outermost layer, and
the outermost layer comprises a glass fiber reinforced plastic layer.

11. The shock absorbing member according to claim 1, wherein
the absorbing member body includes two layers including an outermost layer, and
the outermost layer comprises a glass fiber reinforced plastic layer.

12. The shock absorbing member according to claim 1, wherein
the carbon fiber-glass reinforced plastic layer comprises a plastic-bonded carbon fiber, and has a thermosetting resin as a base material.

13. The shock absorbing member according to claim 1, wherein
the glass fiber reinforced plastic layer comprises a composite having glass fiber as a reinforcing material and a plastic as a matrix.

* * * * *